Nov. 25, 1958 J. L. ROSENBERG 2,861,382

SELF-BRAKING FISH HOOK MOUNTING

Filed Aug. 30, 1957

INVENTOR.
JACK L. ROSENBERG
BY
McMorrow, Berman + Davidson
ATTORNEYS 2,861,382

SELF-BRAKING FISH HOOK MOUNTING

Jack L. Rosenberg, Largo, Fla.

Application August 30, 1957, Serial No. 681,202

4 Claims. (Cl. 43—44.91)

This invention relates to a self-braking fish hook mounting for fishing lines, and to the combination of such a mounting with a fishing line.

The primary object of the invention is to provide an efficient and practical device of this kind which is freely slidable and rotatable on a fishing line unless and until a fish takes a live bait on an associated hook, so that the bait can swim freely relative to the mounting until taken by a fish, the device having lever-operated line engaging brake means which is operated by the pull of a fish taking the bait, whereby the device is secured to the line against rotation and movement along the line and the caught fish can be reeled in on the fishing line, the brake means being maintained in released position by float means, until the bait is taken by a fish.

Another object of the invention is to provide a device of the character indicated, which can be made in well-finished, rugged, and serviceable forms at relatively low cost, is easily installed and removed, and is highly satisfactory for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figures 1, 2, 3:
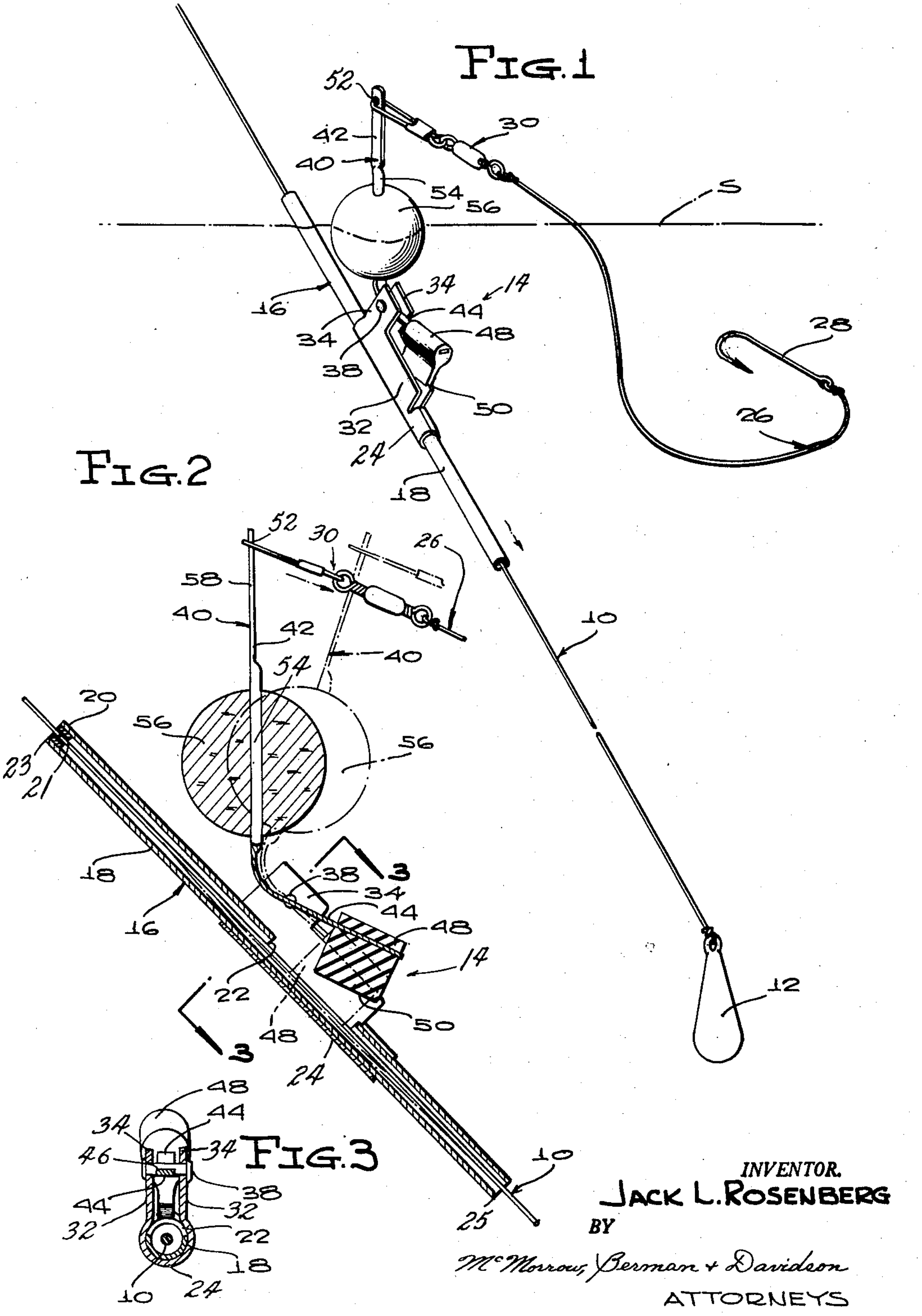
Figure 1 is a perspective view showing a device of the invention installed on a fishing line immersed in a body of water.
Figure 2 is a fragmentary longitudinal section taken through the device, and showing the brake means in released position in full lines and in applied position in phantom lines.
Figure 3 is a transverse section taken substantially on the plane of the line 3—3 of Figure 2.

Referring to the drawings in detail, there is shown a fishing line 10 having on its lower end a sinker 12 of the non-fouling type, immersed in a body of water having a surface S. Slidably and rotatably engaged on the fishing line 10 is a device of the invention, indicated generally at 14, so that when the line is cast into the water, the device 14 will move downwardly along the line toward the sinker 12 until the device reaches a point at the water surface S. Swimming of a live bait on the device can move the device along and around the line 10.

The device 14 comprises a body member 16, which comprises an elongated tube 18, larger in diameter than the line 10, and constructed of any suitable material, through which the fishing line 10 extends. In the upper end of the tube 18 is suitably secured an anti-friction bushing 20, of brass, plastic, or the like, having a reduced axial bore 21 therethrough slidably receiving the fishing line 10. The tube 18 has intermediate and spaced from its ends 23 and 25 an elongated slot 22, exposing an intermediate portion of the fishing line 10 in the tube 18.

Secured on the tube 18 and extending at opposite ends beyond related ends of the slot 22, is a sleeve 24, whose side wall is interrupted and is extended laterally to provide relatively narrow elongated and laterally spaced longitudinal flanges 32 which are widened at their upper ends to provide ears 34 on the flanges 32. The ears 34 are traversed by a headed pivot pin 38.

Secured on the pin 38 between the ears 34 is a reclining L-shaped lever 40 which has a laterally outwardly inclined upper leg 42 and a generally longitudinal downwardly extending lower leg 44. The leg 44 is suitably secured, as indicated at 46 at its upper end to the pivot pin 38, and extends therebelow between the flanges 32 and ears 34, see Figure 3. Suitably secured on the lower end of the leg 44 is a brake shoe 48 of rubber or other suitable material, having an inward side 50 which is engageable through the slot 22 in the tube 18 to engage the fishing line 10, and thereby hold the device 14 against movement along and around the fishing line 10.

An intermediate portion of the leg 42 of lever 40 has secured thereon, as indicated at 54, a preferably spherical float 56 of cork or other suitable material. The upper end of the upper leg 42 may be flattened, as indicated at 58, and has therein a hole 52 through which is securably engaged a swivel 30. The float 56 rests upon the surface S of a body of water and functions to maintain the leg 42 in a substantially upright position, as shown in Figure 1, with the lower arm 44 of the lever 40 and the brake shoe 48 withdrawn out of braking engagement with the fishing line 10, as shown in full lines in Figure 3. A leader 26 is secured at one end to the swivel 30 and has a fish hook 28 on its other end. A live bait, such as a minnow, is secured on the hook 28, and the minnow can freely swim around and along the fishing line 10, and thereby simulate natural conditions and thereby attract fish thereto. When a fish strikes a minnow disposed on the hook 28 and the lever 40 is pivoted about the pivot pin 38, the lower arm 44 of the lever 40 is thereby swung inwardly so that the brake shoe 48 is engaged with the fishing line 10 in the slot 22 and this portion of the fishing line 10 is forced against the inside of the tube 18, so that the device 14 is prevented from moving along or around the fishing line, and the caught fish can be reeled in on the line 10.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed as new is as follows:

1. In combination, a fishing line having a lower end having a sinker thereon, a fish hook mounting comprising a body member slidably and rotatably engaged on the line above the sinker, brake means mounted on said body member and movable relative thereto from a released position to an applied position in braking engagement with the line, float means connected to said brake means for releasably holding said brake means in a released position, and a leader connected to said brake means having a fish hook thereon, whereby taking of bait on the fish hook by a fish may serve to move the brake means from released position to applied position.

2. In combination, a fishing line having a lower end having a sinker thereon, a fish hook mounting comprising a body member slidably and rotatably engaged on the line above the sinker, brake means mounted on said body member and movable relative thereto from a released position to an applied position in braking engagement with the line, float means connected to said brake means for releasably holding said brake means in released position, and a leader connected to said brake means having a fish hook thereon, taking of bait on the fish hook by a fish serving to move the brake means from released position to applied position, said brake means comprising a lever pivoted intermediate its ends on said body member, the leader being secured to one end of the lever and said lever having a brake shoe on its other end, and said float means being mounted on said one end of the lever.

3. A fish hook mounting comprising an elongated fishing line receiving tube having a slot intermediate its ends, means secured to the tube in the region of the slot providing laterally spaced ears, a lever pivoted intermediate its ends on and between said ears, said lever having angularly related upper and lower legs, a brake shoe secured on the lower leg for movement through said slot to engage a part of a fishing line in the tube exposed by said slot, a float on said upper leg normally positioning the lever with the brake shoe withdrawn from the slot, and a leader secured to the upper leg of the lever and having a hook thereon.

4. A fish hook mounting comprising an elongated fishing line receiving tube having a slot intermediate its ends, means secured to the tube in the region of the slot providing laterally spaced ears, a lever pivoted intermediate its ends on and between said ears, said lever having angularly related upper and lower legs, a brake shoe secured on the lower leg for movement through said slot to engage a part of a fishing line in the tube exposed by said slot, a float on said upper leg normally positioning the lever with the brake shoe withdrawn from the slot, and a leader secured to the upper leg of the lever and having a hook thereon, said float being in an intermediate part of the upper lever leg, and said upper lever leg having an upper end to which said leader is secured.

References Cited in the file of this patent

UNITED STATES PATENTS

| | | |
|---|---|---|
| 1,232,545 | Hilsz | July 10, 1917 |
| 1,805,845 | Orr | May 19, 1931 |
| 2,791,858 | Kernodle | May 14, 1957 |